United States Patent [19]

Wolff

[11] 3,744,026

[45] July 3, 1973

[54] OPTICAL LABEL SCANNING

[75] Inventor: Gerald Wolff, Framingham, Mass.

[73] Assignee: Identicon Corporation, Waltham, Mass.

[22] Filed: June 10, 1970

[21] Appl. No.: 44,910

[52] U.S. Cl. .................... 340/146.3 Z, 235/61.11 E, 235/61.12 R, 250/219 D

[51] Int. Cl. .................... G06k 7/14

[58] Field of Search ........... 340/146.3, 146.2, 347 P, 146.3 Z, 340/146.3 C; 235/61.11 E, 61.11 R, 61.12, 92 DN, 61.12 R; 250/219 CD, 219 DC, 219 DD, 219 WD; 209/111.6, 111.5

[56] References Cited

UNITED STATES PATENTS

| | | | |
|---|---|---|---|
| 2,612,994 | 10/1952 | Woodland et al. | 209/111.6 |
| 3,309,667 | 3/1967 | Feissel et al. | 340/146.3 |
| 3,286,233 | 11/1966 | Lesueur | 340/146.3 |
| 3,543,007 | 11/1970 | Brinker et al. | 235/61.11 E |
| 3,458,688 | 7/1969 | Garry et al. | 340/146.3 |
| 3,535,682 | 10/1970 | Dykaar et al. | 340/146.3 C |
| 3,359,405 | 12/1967 | Sundblad | 235/61.11 E |

*Primary Examiner*—Maynard R. Wilbur
*Assistant Examiner*—Leo H. Boudreau
*Attorney*—Charles Hieken

[57] ABSTRACT

A width-coded, self-calibrating label according to the invention includes an initial bar of reference width followed by subsequent bars that are either significantly narrower or significantly wider than the calibration bar to designate binary zero and one, respectively, in a binary coding system. A scanning system scans the labels to first provide a reference signal representative of the width of the initial reference bar and then signals representative of the widths of the other bars relative to that of the reference bar to provide a digital number signal representative of the information binarily encoded on the label.

13 Claims, 8 Drawing Figures

INVENTOR
GERALD WOLFF

BY
Charles Hieken
ATTORNEY

INVENTOR
GERALD WOLFF
BY
Charles Hieken
ATTORNEY

INVENTOR
GERALD WOLFF

BY
Charles Hieken
ATTORNEY

OPTICAL LABEL SCANNING

BACKGROUND OF THE INVENTION

The present invention relates in general to optical labeling and more particularly concerns a novel system for coding combinations of stripes sensitive to radiant energy characterized by ease of encoding, reliable recovery of encoded information, relative ease of operation and manufacture and relatively low systems costs.

One prior art scanning system being used for railroad car identification is described in U.S. Pat. No. 3,225,177 of F.H. Stites granted Dec. 21, 1965, entitled MARK SENSING. That patent describes the coded label as "a vertical array of substantially parallel, horizontally-oriented, light-reflective stripes of substantially equal width arranged in accordance with a preestablished code." In the actual system the labels commonly seen on railroad cars code by color with the detecting system including a separate channel for each color.

While that system has performed well, it has a number of disadvantages. The methods of making multiple color labels are costly and of limited use in "-coded-label-on-demand" situations where numerous applications exist. The colored ink and dichroic filters used to detect the different colors reduce optical efficiency. Furthermore, the requirement for separate detection channels for each color is disadvantageous.

Accordingly, it is an object of this invention to provide an improved labeling system.

It is another object of the invention to provide an improved labeling system that overcomes one or more of the disadvantages enumerated above.

It is a more specific object of this invention to provide a label in accordance with one or more of the preceding objects that includes a source of a calibration indicia for calibrating the detecting system each time the label is scanned.

It is another object of the invention to provide a label in accordance with one or more of the preceding objects that may be accurately and automatically read regardless of the path along which the label is scanned by the detecting system over an exceptionally wide latitude.

It is another object of the invention to provide a system for detecting labels provided in accordance with one or more of the preceding objects.

It is a further object of the invention to provide a system in accordance with the preceding object that is easy to operate and manufacture and relatively low in cost.

SUMMARY OF THE INVENTION

According to the invention, the label comprises first means defining a reference stripe of reference width followed by at least one first data stripe of first width having a first relationship to the reference width and a second data stripe of second width having a different relationship to that of the reference width than said first width has. Preferably the reference width is intermediate the first and second widths. Preferably the reference and data stripes are of material that contrasts with the background material so that light incident upon the label is reflected with different intensity from the stripes than from the background material. Preferably, there are a vertical array of horizontal stripes with the first stripe to be scanned preferably being the reference stripe. In a specific preferred form of the invention there is a reference stripe of intermediate width followed by data stripes which encode one or more decimal digits in a two-of-five binary code.

A detecting system according to the invention comprises means for scanning across the label stripes to provide a scanning signal including a sequence of pulses each of duration proportional to the width of the stripe represented thereby. Means responsive to the first of these pulses establishes a reference signal, preferably a digital number corresponding to the duration of the first of these pulses. Comparison means respond to each subsequent pulse and the reference signal to provide first and second binary bits representative of the first and second widths, respectively, thereby providing a digital indication of the encoded information on the label.

Numerous other features, object and advantages of the invention will become apparent from the following specification when read in connection with the accompanying drawing in which:

DETAILED DESCRIPTION OF PREFERRED EMBODIMENTS

Figure 1:
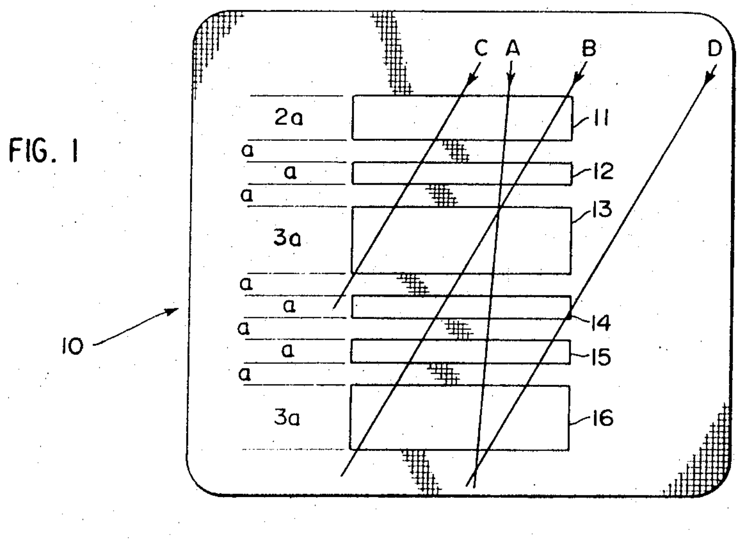
FIG. 1 illustrates a label encoding a single decimal digit according to the invention and representing a number of possible scanning paths.

With reference now to the drawing and more particularly FIG. 1 thereof, there is shown a view of a width-coded self-calibrating label according to the invention. In the specific example shown the initial bar 11 of width $2a$ functions as a width reference, calibrating the system at the beginning of each label scan. The remaining bars 12–16 encode data in the two-of-five binary system. Each of the significantly narrower bars 12,14, and 15 of width a represent binary zero while each of the significantly wider bars 14 and 16 of width 3*a* represent binary one. Preferably the separation between adjacent bars is of width *a* so that the optimum scanning aperture for such a label has a vertical dimension of *a*. Thus, the pattern on the label 10 on FIG. 1 encodes 01001.

The specific dimensional relationship is by way of example only. It is evident that those skilled in the art may depart from these preferred dimensions within the principles of the invention. However, the preferred relationship among dimensions illustrated is advantageous because each dimensional difference corresponds to the optimum aperture width. This relationship helps optimize detection.

The bar material itself may be white paper, retroreflective, fluorescent or any other material whose optical reflectance is sufficiently stronger than that of the material separating the bars to produce a detectable signal. Although, as illustrated, making the label background black emphasizes contrast, a black or even dark background is not necessary as long as there is enough difference in reflectance to permit detection. Obviously the background could be more reflective than the stripes within the principles of the invention; however, it is preferred that the stripes be reflective because less total reflective material is required.

Figure 2:
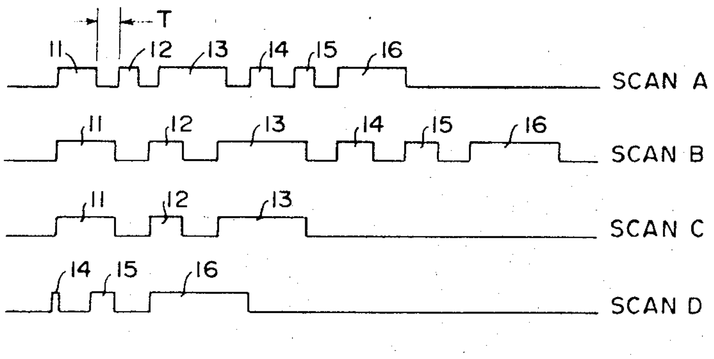
FIG. 2 is a graphical representation of signal waveforms as a function of time illustrating the waveforms derived from scanning along the different paths in FIG. 1.

FIG. 1 illustrates a number of possible scanning paths designated A, B, C and D. Although the nearly perfectly vertical scanning path A is normal and preferred, the invention is capable of scanning along skew paths such as B while accurately detecting the encoded information. Referring to FIG. 2, there is shown a graphical representation of the waveforms that would be derived from scanning along paths A, B, D and D, respectively. In FIG. 2 each of the output pulses is identified by a reference numeral corresponding to that stripe of the label of FIG. 1 represented by that pulse. Thus, scanning along path B produces the same number and sequence of reference width, narrow and broad pulses as produced by scanning along path A. Because the scan along path B is longer than that along path A, the duration of each pulse and the space between pulses is extended proportionately. However, the detecting system can easily tell that each of pulses produced by scanning narrow stripes 12 and 14 is shorter than the pulse produced by scanning reference stripe 11 while each of the pulses produced by scanning the broad stripes 13 and 16 is longer. Thus, so long as the apparatus accepts no more and no less than the correct number of pulses with the correct parity (two out of five in this case) within a predetermined scanning interval, it may accurately read the information encoded.

If the skew is too great so that less than the correct number of pulses occur during this predetermined scan interval, such as when scanning along paths C or D, the apparatus will reject the data thus derived as erroneous.

Using a two-of-five code, or any method of parity coding, avoids a requirement for a distinct start code, although such a code could be added, for example, to provide redundancy or in association with a nonparity coding scheme. Particular parity and nonparity codes are well known in the art and are not a part of the invention.

Still additional security may be provided by including logical circuitry for invalidating the reference signal as spurious unless a second pulse follows within a predetermined period corresponding to the scanning duration of the space between adjacent stripes for a predetermined maximum skew angle.

The label thus described may be fabricated simply and inexpensively by masking or overprinting the desired label material. There are no spectral filters to impair optical efficiency. And only a single detection channel is required.

Figure 3:
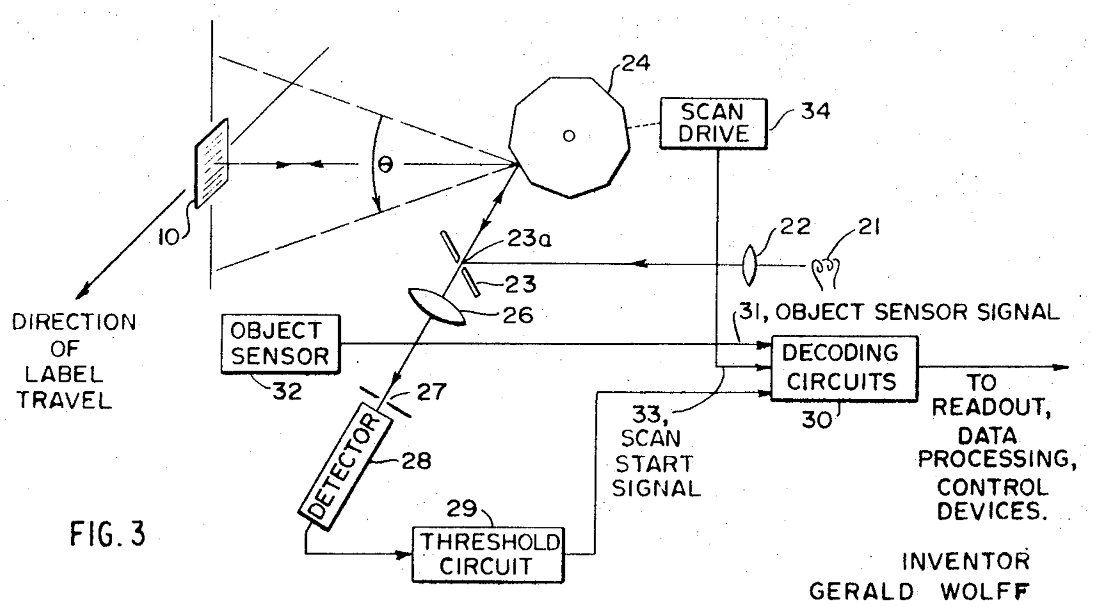
FIG. 3 is a combined block-pictorial diagram illustrating the logical arrangement of a system for scanning labels according to the invention.

Referring to FIG. 3, there is shown the logical arrangement of a system for scanning label 10 as it moves along a direction of label travel represented by arrow 20 generally parallel to the horizontal stripes. Light from a source 21 is focused by lens system 22 and reflected by apertured mirror 23 upon a multifaceted scanning mirror 24. The rotation of scanning mirror 24 causes the light beam to scan repetitively through a vertical scan angle $\theta$. If an object bearing label 10 intersects this scan angle, scanning mirror 24 reflects light from the label back to the aperture 23a in mirror 23. Lens 26 then focuses this apertured light into the aperture 27 of photodetector 28. Photodetector 28 converts this light energy into electrical signals which are converted into pulses, such as those represented in FIG. 2, by threshold circuit 29 with durations proportional to the width of the label bars. The coding circuits 30 convert the resulting pulse rate to useful information in response to an object sensor signal provided on line 31, indicating that an object is in position to be scanned provided by object sensor 32, and a scan start signal on line 33 provided by scan drive 34, indicating that the start of a scan has just commenced.

Figure 4:
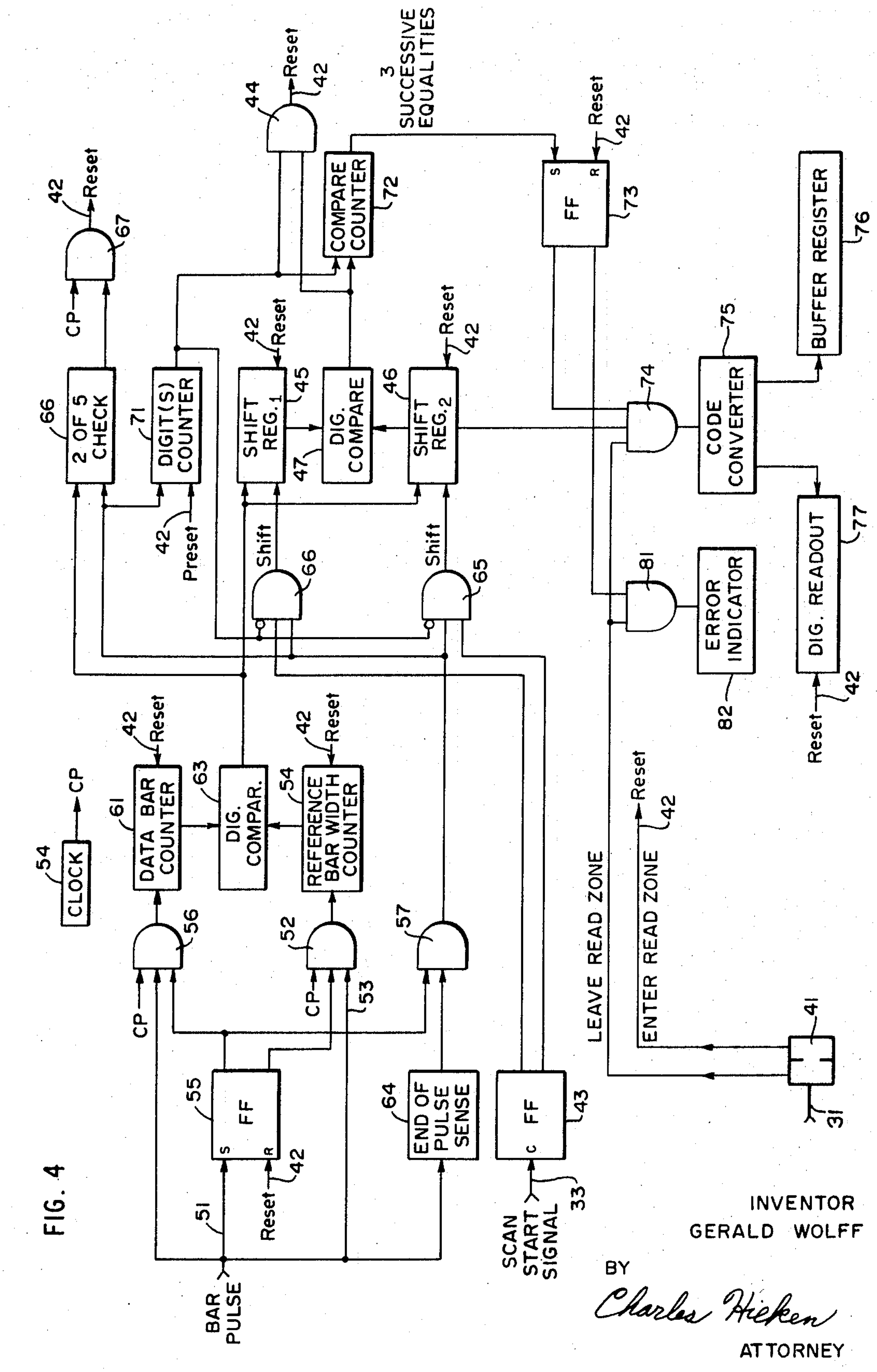
FIG. 4 is a block diagram of an exemplary embodiment of decoding circuits according to the invention.

Referring to FIG. 4, there is shown a block diagram illustrating the logical arrangement of an exemplary embodiment of decoding circuits according to the invention. When an object bearing a label enters the read zone, object sensor 32 provides an appropriate signal on line 31 that sets input flip-flop 41 to produce a signal on reset line 42 that resets all clip-flop registers, counters and readouts. It is convenient to initially assume that this resetting has occurred.

The first bar pulse from threshold circuit 29 on line 51 enables gate 52 on leg 53 to transmit clock pulses from clock pulse source 54 on the CP line to reference bar width counter 54. The number of clock pulses admitted to bar width counter 54 is then proportional to the reference width of this first bar pulse. The trailing edge of the first bar pulse sets a J–K flip-flop 55 to disable gate 52 and enable calibration bar counter input gate 56 and end of pulse gate 57.

The next bar pulse on line 51 then enables gate 56 to transmit clock pulses to data bar counter 61. A bit-by-bit comparator 63 then provides an output signal representative of which counter has the larger count, the data bar counter 61 or the reference bar width counter 54 to designate binary ZERO and ONE if the data bar width counter is less and greater, respectively, than the reference count. This procedure is repeated for each of the remaining four bars, and the result of each comparison is stored in that one of shift registers 45 and 46 then enabled to receive such data, these shift registers being enabled on alternate scans in a manner to be described below.

The loading and shifting occurs at the end of each bar pulse when end of pulse sensor 64 provides a signal through gate 57 to the enabled one of gates 65 and 66, respectively. The toggle flip-flop 43 alternately enables gates 65 and 66 as it switches between set and reset gates in response to each scan start signal applied on line 33 to load registers 45 and 46 on alternate scans.

The apparatus also includes a two-of-five check circuit 66 that responds to the binary data provided by digital comparator 63 to produce an output signal that enables gate 67 to pass a clock pulse to reset line 42 if this check is not satisfied. That is to say, it must receive two and only two ONE signals during each five-pulse interval. Since circuits of this type are well known in the art, details are not included herein.

The apparatus also includes a digit counter 71 that functions to keep track of the number of digits. It is typically preset for the number of expected digits and stepped down once for each group of five correctly coded data bar pulses, inhibiting gates 65 and 66 after the preset number of digits have occurred and thereby preventing registers 42 and 45 from accepting any additional digits. If a group of five data pulses does not meet the two-out-of-five condition or, as indicated above, digital comparator 47 fails to indicate equality in shift registers 45 and 46 on consecutive scans, output gates 67 or 44 respectively provide a reset pulse on line 42 to reset everything, allowing the loading of new data for another try.

Compare counter 72 counts a predetermined number of successive equalities, typically three, to provide an output pulse that sets accept flip-flop 73 to enable data output gate 74 when strobed to transmit data from shift register 46 to code converter 75 and then into output buffer register 76 and digital readout 77.

When the object bearing the label leaves the read zone, a signal from object sensor 32 strobes gates 74 and 81 so that if flip-flop 73 was set, the contents of shift register 46 representing the correct label data, pass through gate 74 for display by direct digital readout 77 and storage in buffer register 76 for further processing. However if flip-flop 73 is in the reset condition at that time, it signifies that the label has not been read correctly (or no label was attached) to enable gate 81 to provide an output signal that energizes error indicator 82.

It may also be advantageous to include circuitry that measures the time interval between the first two received bar pulses to provide a resetting signal on line 42 if that interval exceeds a predetermined minimum time interval.

The system of FIG. 3 is by way of example for illustrating only one method of scanning the label. Other energy sources, such as infrared or ultraviolet may be substituted for the visible light source 21.

Figure 5:
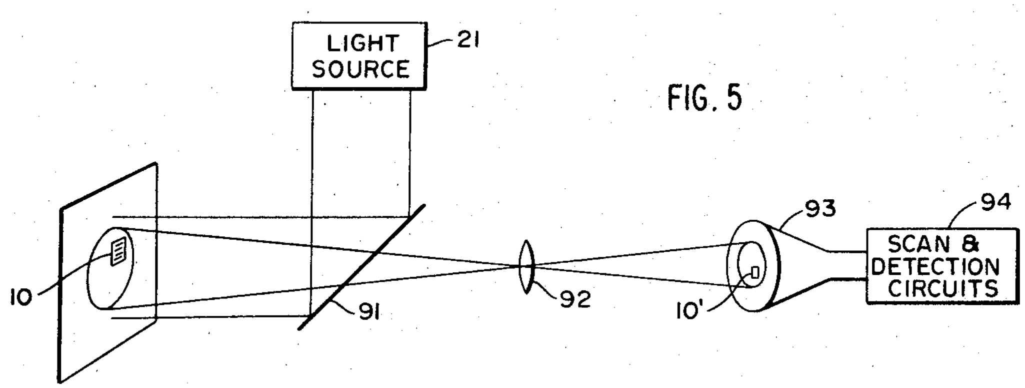
FIG. 5 is a block diagram illustrating the logical arrangement of another scanning system according to the invention in which the label is imaged upon the face of a CRT comprising a flying spot scanner.

Referring to FIG. 5, there is shown a combined pictorial-block diagram illustrating a flying spot scanner for providing the bar pulses. Light source 21 illuminates label 10 through half-silvered mirror 91 to produce an illuminated image that is focused by lens 92 upon the face of cathode ray tube 93 so that the image 10′ of the label may be scanned by the CRT electron beam in known manner to transform them into pulses for decoding that may be applied to line 51 of the coding circuit 30.

Figure 6:
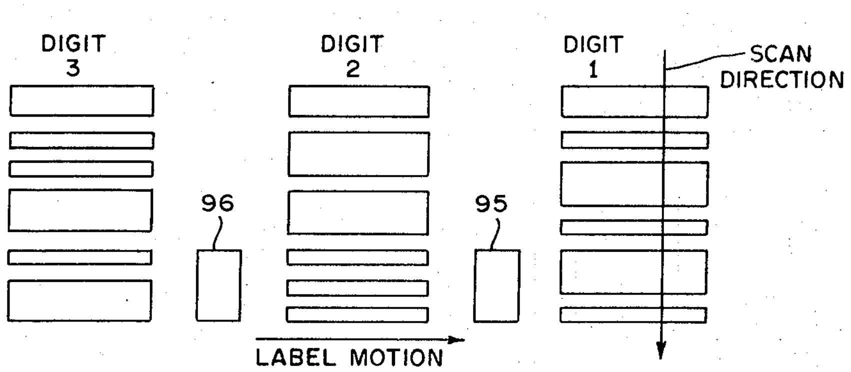
FIG. 6 illustrates another label according to the invention in which a number of side-by-side vertical arrays of horizontal stripes encode a sequence of digits each binarily encoded in the two-of-five code.

Referring to FIG. 6, there is shown an alternate label configuration that may be derived from the basic label configuration of FIG. 1. There is illustrated a parallel digit representation in which first, second and third digits are represented by first, second and third bar sets separated by bars such as 95 and 96, preferably of width 5*a* to provide recognition of the space between digits. This width is greater than twice the calibration bar width and easily instrumented by one left-shift in the start digital value.

Figure 7:
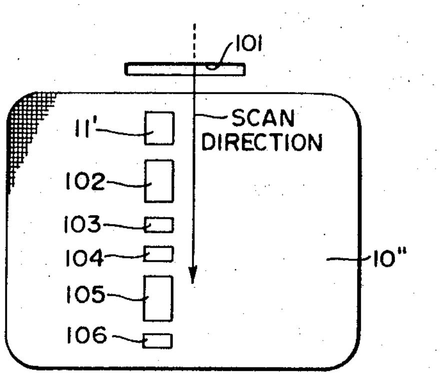
FIG. 7 illustrates another label that is the dual of the label of FIG. 1 and comprises dots for scanning by a wide slit.

Referring to FIG. 7, there is shown the dual 10″ of the label 10 of FIG. 1 adapted to be scanned by a wide slit aperture 101. Still regarding the dimension along the scan direction as width, reference dot 11′ has the same width 22 as bar 11 while the wide dots 102 and 104 have the same dimension 3*a* as the wide bars 13 and 16 while the narrow dots 103, 104 and 106 have the same width a as the narrow bars 12, 14 and 15 in FIG. 1. Although the signal-to-noise ratio may be somewhat reduced with the label of FIG. 7, the information may be encoded on a smaller label.

Figure 8:
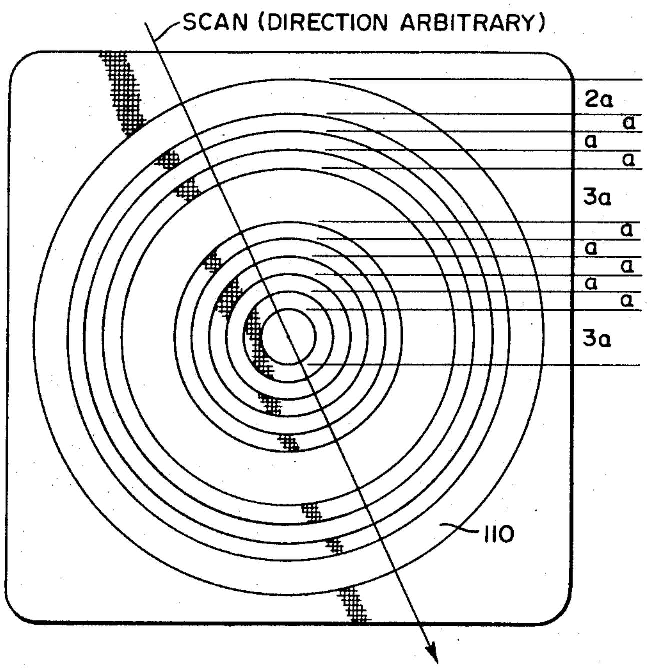
FIG. 8 illustrates still another label according to the invention in which the data is carried by alternating concentric circles that may be accurately recovered from scanning in any direction.

Referring to FIG. 8, there is shown still another embodiment of a label according to the invention in which the information is carried by annular rings forming a bullseye configuration. The principles of the invention may be retained by having the outer ring 110 of reference radial width 2*a* while the remaining rings may be of radial width a or 3*a*. A feature of this invention is that the scan may be along any arbitrary direction, and the center circle of diameter 3*a* may be used to denote the end of a scan. That is to say, the logical circuitry may be arranged so that a valid reading requires that the sixth bar scanned be of width 3*a*.

Any code, standard or nonstandard, with or without parity may be used. It is also possible to use codes other than binary. For example, the separation bars 95 and 96 help establish a trinary code. There has been described a novel coded label and associated scanning and decoding system characterized by self calibration in conjunction with width coding resulting in a highly reliable scanning and decoding system relatively free from complexity. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely the spirit and scope of the appended claims.

What is claimed is:

1. Identification apparatus comprising, label means having a plurality of indicia defining intervals along a predetermined scanning direction, means including the first of said indicia defining a reference interval of reference width for providing a reference signal of reference time duration, and means including at least two others of said indicia spaced from said first indicia along said scan direction defining data intervals of different widths for providing data signals of correspondingly different data time durations for comparison with said reference duration so that each data duration derived on a scan may be compared with said reference duration derived on that scan to unambiguously identify that data represented by said data intervals on the basis of comparing said reference duration representative of said reference width with each data duration representative of each data width on each scan, reference storage means for storing at least said reference signal to provide for the duration of each scan a stored reference signal representative of said reference width, and means responsive to said data signals for comparing a signal representative of each data duration with said stored reference signal on each scan to provide, for each data signal on a scan, a digit signal having a first value when the associated data interval width bears a first relationship to the reference interval width and is different from said reference interval width and having a second value different from said first value when said associated data interval width bears a second relationship to said reference interval width that is different from said first relationship, and to always provide on each scan a sequence of as many digit signals as there are data intervals identifying the sequence of digits represented by the data intervals, each of said digit signals always being derived by the comparison of a data duration representative signal with the stored reference signal.

2. Identification apparatus in accordance with claim 1 wherein said indicia comprise a group of bars disposed along said scanning direction.

3. Identification apparatus in accordance with claim 1 wherein the separation between adjacent intervals corresponds substantially to the smallest of said intervals.

4. Identification apparatus in accordance with claim 1 wherein said indicia and the spaces therebetween comprise concentric annular regions.

5. Identification apparatus in accordance with claim 1 and further comprising, means for scanning said label means to provide a pulse train with each pulse of time duration corresponding to a respective one of said widths, and means responsive to the pulse derived from scanning said reference interval for providing said reference signal on each scan.

6. Identification apparatus in accordance with claim 5 wherein the smallest of said intervals is of width a, the separation between said intervals is substantially said width a, and said means for scanning includes a scanning aperture having an effective scanning width for scanning said indicia corresponding substantially to said width a, 7. Identification apparatus in accordance with claim 1 wherein said indicia comprise a plurality of stripes parallel to one another along a direction orthogonal to said scanning direction.

8. Identification apparatus comprising, label means having a plurality of indicia defining intervals along a predetermined scanning direction, means defining the first of said intervals of a first width, means defining the widths of others of said intervals spaced from said first interval of different widths from said first interval, means for scanning said label means to provide a pulse train with each pulse of duration characteristic of an associated one of said intervals, a source of clock pulses, reference bar counter means for storing a digital signal proportional to the duration of a pulse representative of said first interval, data bar counter means for storing a digital signal proportional to the duration of respective ones of the pulses in said train after the first during each scan, means responsive to at least the first of said pulses for gating pulses from said clock pulse source into said reference counter means to store a reference count therein representative of said first interval width, means responsive to the remaining ones of said pulses in said pulse train for gating pulses from said clock pulse source into said data counter means for the duration of each of the latter pulses to provide a corresponding number of data counts in sequence each representative of the width of a corresponding one of said others of said intervals, and means for comparing each data count with said reference count on each scan to provide for each scan a sequence of digit signals, each having a first value when the associated data count bears a first relationship to the reference count and is different from said reference count and having a second value different from said first value when said associated data count bears a second relationship to said reference count that is different from said first relationship.

9. Identification apparatus in accordance with claim 8 and further comprising first and second storage means for storing sequences of said digit signals with each sequence being representative of a complete scan of said indicia along said scanning direction, means for storing successive ones of said sequences in said first and second storage means, means for comparing the sequence of digit signals stored in said first storage means with those stored in said second storage means to provide a compare signal when the two stored sequences are the same, an output device, and means responsive to a predetermined number of said compare signals indicating a predetermined number of consecutive identical sequences for transferring at least one of said stored sequences to an output device.

10. Identification apparatus in accordance with claim 9 and further comprising, means for indicating the time interval in which said label may be scanned, and means responsive to the termination of said time interval and the absence of said predetermined number of compare signals for providing an error signal.

11. Identification apparatus comprising, label means having a plurality of indicia defining intervals along a predetermined scanning direction, means defining the first of said intervals of a first width, means defining the widths of others of said intervals spaced from said first interval of different widths from said first interval, means for scanning said label means to provide a pulse train characteristic of said intervals, means responsive to the pulse derived from scanning the first of said intervals for providing a reference signal, means responsive to the pulses derived from scanning the remaining intervals for providing representative data signals, and means for comparing each data signal with said reference signal to provide an output signal representative of the relationship between the width of each of said following intervals and said first interval, said means for providing said reference and data signals include data bar and reference bar counters for respectively providing said reference and data signals in digital form, and further comprising first and second storage means for storing sequences of said output signals, each of said sequences being representative of a complete scan of said indicia along said scanning direction, means for storing successive ones of said sequences in said first and second storage means, means for comparing the sequence of output signals stored in said first storage means with those stored in said second storage means to provide a compare signal when the two stored sequences are the same, an output device, and means responsive to a predetermined number of said compare signals indicating a predetermined number of consecutive identical sequences for transferring at least one of said stored sequences to said output device.

12. Identification apparatus in accordance with claim 11 wherein said first and second storage means comprise first and second shift registers for storing digital number signals representative of said others of said indicia and said means responsive to compare signals comprises a compare counter.

13. Identification apparatus in accordance with claim 11 and further comprising, means for indicating the time interval in which said label may be scanned, and means responsive to the termination of said time interval and the absence of said predetermined number of compare signals for providing an error signal.

* * * * *